(12) United States Patent
Umewaka et al.

(10) Patent No.: US 7,386,328 B2
(45) Date of Patent: Jun. 10, 2008

(54) RECEIVER

(75) Inventors: Masahiro Umewaka, Ota (JP); Hiroya Yamamoto, Ora-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 125 days.

(21) Appl. No.: 10/953,373

(22) Filed: Sep. 29, 2004

(65) Prior Publication Data

US 2005/0070341 A1    Mar. 31, 2005

(30) Foreign Application Priority Data

Sep. 29, 2003    (JP) .............................. 2003-336957

(51) Int. Cl.
*H04B 17/02*    (2006.01)
(52) U.S. Cl. ...................... 455/574; 455/133; 455/277; 375/347
(58) Field of Classification Search ................ 455/132, 455/323, 313, 277.2, 434, 574, 133, 277; 725/9, 46; 330/10; 375/347; 340/5.61, 340/825
See application file for complete search history.

(56) References Cited

U.S. PATENT DOCUMENTS 5,099,203 A * 3/1992 Weaver et al. ................ 330/10
5,559,838 A * 9/1996 Nakagoshi ................... 375/347
6,108,541 A * 8/2000 Yazaki et al. ................ 455/434
6,473,601 B1 * 10/2002 Oda ............................ 455/132
6,552,649 B1 * 4/2003 Okada et al. ............... 340/5.61
2003/0093792 A1 * 5/2003 Labeeb et al. ................. 725/46
2003/0115588 A1 * 6/2003 Hoshino ......................... 725/9

FOREIGN PATENT DOCUMENTS

JP            2000-78063        3/2000

OTHER PUBLICATIONS

English Patent Abstract of 2000-78063 from esp@cenet.

* cited by examiner

*Primary Examiner*—Joseph Feild
*Assistant Examiner*—Michael Vu
(74) *Attorney, Agent, or Firm*—Osha·Liang LLP

(57) ABSTRACT

To provide a receiver having a plurality of receiver circuits respectively connected to different antennas and a selecting circuit for selecting a receiver circuit whose receiving level is equal to a predetermined threshold value or a receiver circuit whose receiving level is higher than the predetermined threshold value as a main processing circuit to bring at least some of the receiver circuits other than the selected receiver circuit into a non-operation state.

7 Claims, 4 Drawing Sheets

| Case No. | Determination result signal (Input) | | | Selection signal (Output) | | |
|---|---|---|---|---|---|---|
| | da' | db' | dc' | sa | sb | sc |
| 1 | 0 | 1 | 1 | 1 | 0 | 0 |
| 2 | 1 | 0 | 1 | 0 | 1 | 0 |
| 3 | 1 | 1 | 0 | 0 | 0 | 1 |
| 4 | 0 | 0 | 1 | 1 | 0 | 0 |
| 5 | 0 | 1 | 0 | 1 | 0 | 0 |
| 6 | 1 | 0 | 0 | 0 | 1 | 0 |
| 7 | 0 | 0 | 0 | 1 | 0 | 0 |
| 8 | 1 | 1 | 1 | 0 | 0 | 0 |

Fig. 3

RECEIVER

CROSS-REFERENCE TO RELATED APPLICATION(S)

The entire disclosure of Japanese Patent Application No. 2003-336957 including specification, claims, drawings and abstract is incorporated herein by reference in its entirely.

BACKGROUND OF THE INVENTION

1. Field of the Invention

The present invention relates to a receiver connected to a plurality of antennas, and particularly to a technique making it possible to reduce power consumption.

2. Description of the Prior Art

A receiver is hitherto known which is provided with a diversity mechanism for selecting and processing a signal having the highest receiving level among signals received by a plurality of antennas. Some comparatively small receivers, such as remote control units for an on-vehicle communication system (for example, radio key apparatuses), use a diversity mechanism in order to obtain a signal having a higher receiving level. For example, this type of conventional receiver is disclosed in Patent Document 1 of Japanese Patent Laid-Open Publication No. 2000-78063.

However, in the case of a conventional diversity mechanism for selecting a signal having the highest receiving level, a circuit configuration becomes complex and this is one of the factors for further decreasing a receiver in size and weight. Moreover, further reducing power consumption has been a demand for this type of receiver. When it is possible to reduce power consumption, there are advantages for a receiver using batteries in that a cycle for replacing batteries is lengthened or the receiver can be decreased in size and weight by an extent proportional to the decrease in battery capacity.

SUMMARY OF THE INVENTION

The present invention is a receiver provided with a plurality of receiver circuits respectively connected to different antennas and a selecting circuit for selecting any one of the receiver circuits having a receiving level equal to or hither than a predetermined threshold value as a main processing circuit to bring at least some of the receiver circuits other than the selected receiver circuit into a non-operation state.

BRIEF DESCRIPTION OF THE DRAWINGS

Preferred embodiment(s) of the present invention will be described in detail based on the following figures, wherein:

FIG. 3 is a truth table of output values (selected signals) to input values (determination result signals) of the signal selecting circuit in FIG. 2 (and FIG. 4)

DESCRIPTION OF THE PREFERRED EMBODIMENTS

Figure 1:
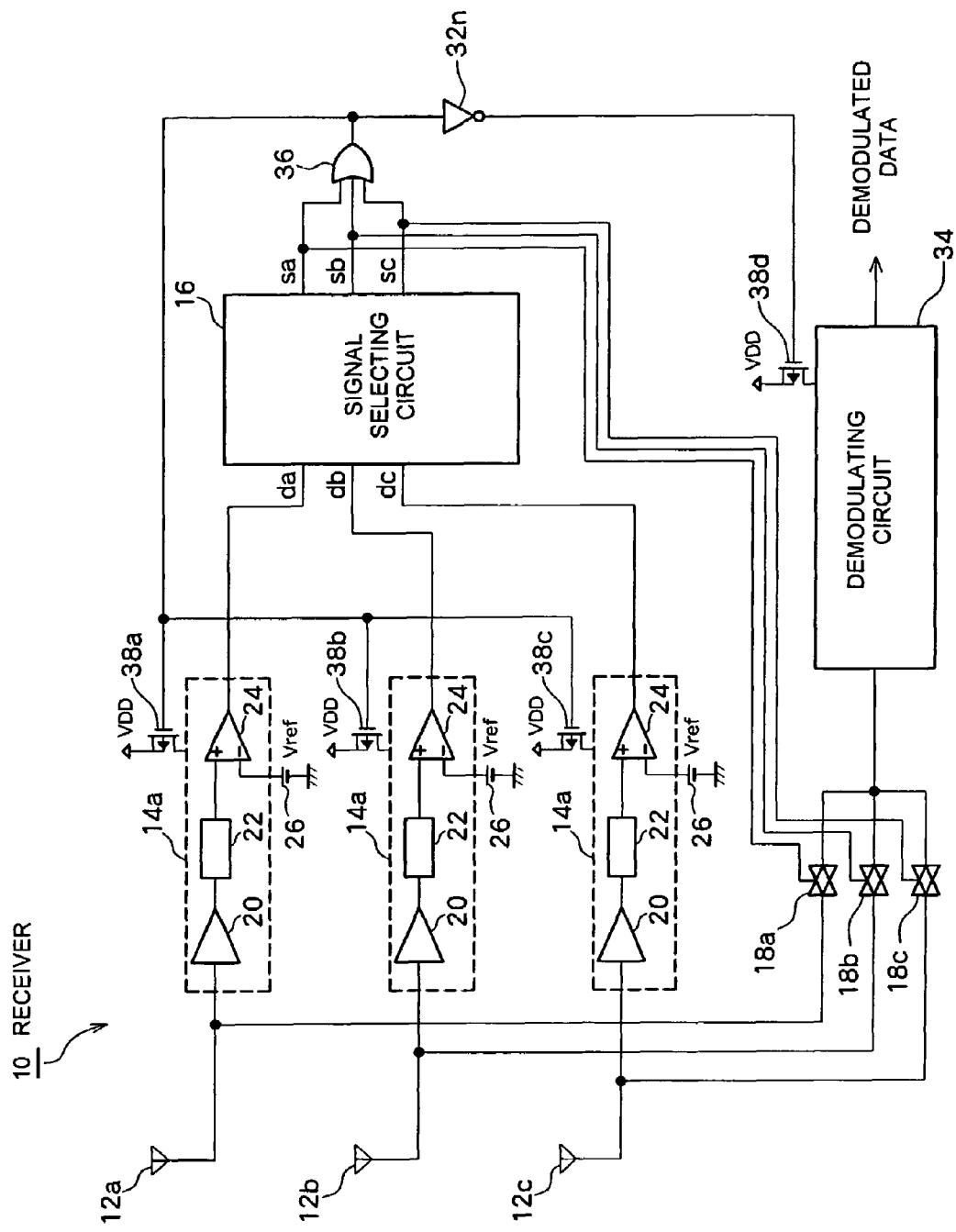
FIG. 1 is a block diagram showing a configuration of an essential section of a receiver of a first embodiment.
Figure 2:
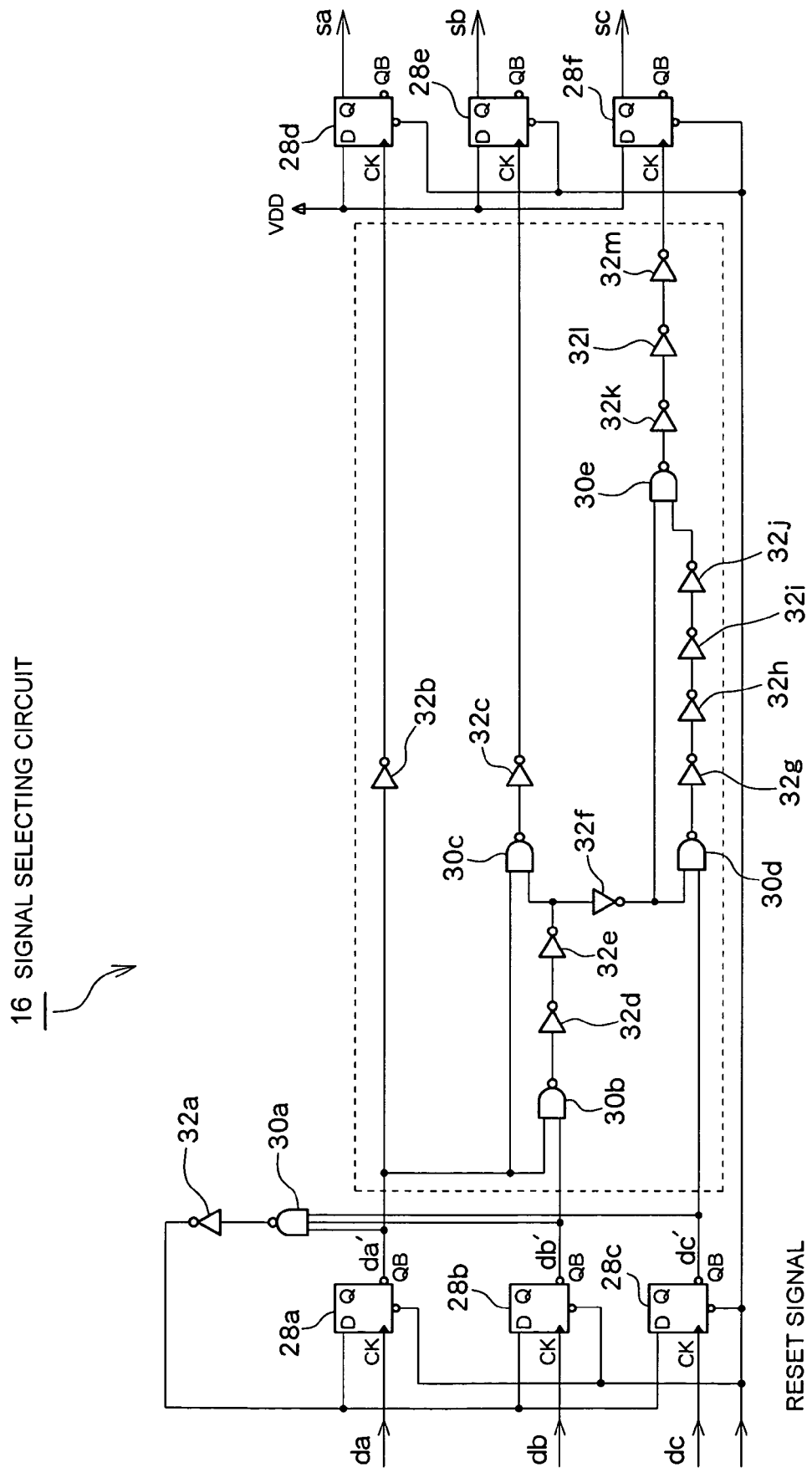
FIG. 2 is a circuit diagram showing a signal selecting circuit of the receiver of the first embodiment.

A preferred embodiment of the present invention is described below with reference to the accompanying drawings. FIG. 1 is an illustration showing a schematic configuration of an essential section of a receiver 10 of this embodiment. FIG. 2 is an illustration showing a schematic configuration of an essential section of a signal selecting circuit 16. FIG. 3 is an illustration showing a truth table of outputs to inputs of the signal selecting circuit 16. The receiver of this embodiment is a receiver for an on-vehicle communication system including an on-vehicle unit and a remote control unit, which can be used for a remote control unit.

The receiver 10 of this embodiment selects any one of signals received by a plurality of antennas (three antennas in FIG. 1) 12a, 12b, and 12c and executes predetermined processing for the selected signal (e.g. demodulation processing). At the same time, the receiver 10 reduces power consumption by bringing at least some of the circuits for processing signals other than the selected signal into a non-operation state. To execute this processing, the receiver 10 is provided with receiving-level determining sections 14a, 14b, and 14c, a signal selecting circuit 16, and switching devices 18a, 18b, and 18c. The receiver 10 has parallel circuits connected to the antennas 12a, 12b, and 12c respectively (circuits between the receiving-level determining sections 14a, 14b, and 14c, antennas 12a, 12b, and 12c, and switching devices 18a, 18b, and 18c). These correspond to receiver circuits. It is preferable that the antennas 12a, 12b, and 12c are set so that their axial directions are different from each other (for example, so that three axes are orthogonal to each other). Particularly, because a small remote control unit can take an optional attitude, the probability of being able to obtain an incoming signal having a high receiving level, that is, a high sensitivity, is raised by using the antennas 12a, 12b, and 12c different from each other in polarized wave direction.

The receiving-level determining sections 14a, 14b, and 14c determine whether levels of signals received by the antennas 12a, 12b, and 12c are equal to or higher than a predetermined threshold value and output determination result signals. In the case of the example in FIG. 1, the receiving-level determining sections 14a, 14b, and 14c are respectively provided with an amplifier 22, comparator 24, and reference power supply 26. According to this configuration, each of the antennas outputs an H(high)-level signal when the DC component (receiving level) of an incoming signal is higher than the threshold voltage Vref of the reference power supply 26. That is, in the case of the example in FIG. 1, a determination result signal is output as a binary signal of H level or L (low) level.

The receiver of this embodiment has a selecting circuit for selecting one receiver circuit in accordance with priorities preset for a plurality of receiver circuits. A switching device included in a receiver circuit other than the selected receiver circuit is switched from a connected state to a cut-off state and circuits from the switching device up to antennas are brought into a non-operation state.

The signal selecting circuit 16 selects any one of a plurality of receiving-systems in accordance with a determination result signal. In the case of the example in FIG. 2, the signal selecting circuit 16 includes a logic circuit for outputting a binary selection signal Sa-Sc in accordance with a determination result signal da-dc output as a binary signal. Specifically, the determination result signal is input to CK terminals of delay flip-flops (edge-triggered flip-flops; hereafter simply referred to as DFF) 28a, 28b, and 28c. In this case, in a standby mode, D terminals of the DFFs 28a, 28b, and 28c are kept H-level. Therefore, when CK terminals are changed to H-level by the determination result signal, QB terminals of the DFFs 28a, 28b, and 28c are changed from H-level to L-level. To differentiate between the DFFs 28a, 28b, and 28c from DFFs 28d, 28e, and 28f to be described later, the DFFs 28a, 28b, and 28c are referred to as input-side DFFs and the DFFs 28d, 28e, and 28f are referred to as output-side DFFs.

In this case, the signal selecting circuit 16 is constituted so that when a determination result signal is once input from any one of the receiving-level determining sections 14a, 14b, and 14c, thereafter even if a determination result signal is changed, selection according to a determination result signal after the determination result signal is output is, at least temporarily, not performed. In the case of the example in FIG. 2, the signal selecting circuit 16 is provided with a NAND gate 30a for performing a logical NAND of the QB terminal outputs (reversed outputs of Q terminal) of all of input-side DFFs 28a, 28b, and 28c and an inverter 32a for inverting an output of the NAND gate 30a and an output of the inverter 32a is connected to D terminals of the DFFs 28a, 28b, and 28c. According to this configuration, when a determination result signal is input to the CK terminal of any DFF (for example, DFF 28a) from a reset state (that is, QB outputs of all of the DFFs 28a, 28b, and 28c are kept at H-level) or QB outputs become L-level, an output of the NAND gate 30a becomes H-level and an output of the inverter 32a, that is, a D-terminal input, becomes L-level. In this case, even if any one of the CK terminal inputs of the DFFs 28a, 28b, and 28c becomes H-level in accordance with a determination result signal, an output of the DFF is not changed. That is, according to this configuration, when a determination result signal is once input to the signal selecting circuit 16 from any one of the receiving-level determining sections 14a, 14b, and 14c, inputs of subsequent determination result signals are not accepted until the section 16 is reset. Therefore, a plurality of receiver-systems being selected or selecting destinations being changed is prevented. Because the above configuration is only an example, the same function can be realized by other configurations. For example, it is possible to provide an AND gate (not illustrated) for performing a logical AND of QB terminals of all of the input-side DFFs 28a, 28b, and 28c instead of the NAND gate 30a and inverter 32a and use outputs of the AND gate as D-terminal inputs of the DFFs 28a, 28b, and 28c or provide a NOR gate (not illustrated) for performing a logical NOR of D terminals of all of the input-side DFFs 28a, 28b, and 28c and use outputs of the NOR gate as D-terminal inputs of all of the DFFs 28a, 28b, and 28c.

The signal selecting circuit 16 selects any one of a plurality of receiving-systems in accordance with an input determination result signal. In the case of this embodiment, a receiving-system outputting the highest receiving level is not always selected and receiving-systems whose receiving levels exceed a threshold value (or equal to or more than the threshold value) can be objects to be selected. Moreover, to select only one of the systems, priorities are respectively allocated to the receiving-systems in the case of this embodiment and the signal selecting circuit 16 selects a receiving-system in accordance with the priority. That is, when a determination result signal is input from any one of the receiving-level determining sections 14a, 14b, and 14c, a receiving-system corresponding to one of the receiving-level determining sections 14a, 14b, and 14c is selected. However, when determination result signals (H level) are simultaneously input from the receiving-level determining sections 14a, 14b, and 14c, a receiving-system circuit having the highest priority is selected from the receiving-systems. As described above, the signal selecting circuit 16 has a function for ignoring subsequent inputs of determination result signals (H level) after a determination result signal (H level) is once input from any one of the receiving-level determining sections 14a, 14b, and 14c. In this case, however, it is assumed that when determination result signals are almost simultaneously input from the receiving-level determining sections 14a, 14b, and 14c in parallel, the determination result signals may be handled as effective signals.

The example in FIG. 2 is a circuit including NAND gates 30b to 30e and inverters 32b to 32k. This circuit outputs selection signals (H level) shown on the truth table in FIG. 3. FIG. 3 shows CK-terminal inputs of the output-side DFFs 28d, 28e, and 28f to QB-terminal outputs of the input-side DFFs 28a, 28b, and 28c, in which H level is shown as 1 and L level is shown as 0. As shown in FIG. 3, the system at the upper stage in the case of the example in FIG. 2, that is, the receiving-systems (receiver circuit) connected to the antenna 12a, has the highest priority and the receiving-system at the middle stage and the receiving-system at the low stage have successively lower priorities. When a determination result signal is independently output from the receiving-level determining section 14b or 14c earliest, a receiver circuit corresponding to the receiving-level determining section 14b or 14c is selected. However, when determination result signals are simultaneously output from receiving-systems having higher priorities, that is, the receiving-systems shown at the upper side in FIG. 2, the receiving-system having higher priority is selected. In the case of the processing for comparing receiving levels of receiver circuits and selecting the highest receiving level from the receiving-systems, a circuit becomes complex like the case of a conventional diversity mechanism. According to this embodiment, however, it is possible to simplify a circuit compared to the case of a conventional one.

In this case, the signal selecting circuit 16 in FIG. 2 includes an even number (for example, two or four) of inverters (32d and 32e, 32g to 32j, 32k and 32l) connected in series as delay elements. These delay elements are set so that a selection result different from a selection result to be originally obtained does not occur due to a shift of the signal input timing to logic gates (for example, NAND gates 30c and 30e) in the signal selecting circuit 16.

Description is given below using a specific example. The QB-terminal output of the DFF 28a and an output of the NAND gate 30b are input to the NAND gate 30c in FIG. 2. When the delay time from the QB terminal of the DFF 28a to the input terminal of the NAND gate 30c is larger than the delay time from the output terminal of the NAND gate 30b to the input terminal of the NAND gate 30c, results shown by the truth table in FIG. 3 may not be obtained. For example, case No. 4 is considered in which a determination result signal (H level) is simultaneously input to the DFFs 28a and 28b (when da' and db' are set to "0" and dc' is set to "1"). According to the truth table in FIG. 3, a receiving-system to be connected to the antenna 12a must be selected (sa is set to "1"). However, if a signal sent from the NAND gate 30b is input to the NAND gate 30c earlier than a signal sent from the DFF 28a due to an actual wiring structure, the NAND gate 30c becomes the same state as case No. 2 in which a determination result signal (H level) is first independently input to the DFF 28b (when db' is set to "0" and da' and dc' are set to "1"). As a result, a selection signal for selecting a receiving-system to be connected to the antenna 12b is output from the signal selecting circuit 16 (sb is set to "1"). Thereafter, when a signal sent from the DFF 28a reaches the NAND gate 30c and a selection signal when a determination result signal (H level) is simultaneously input to the original DFFs 28a and 28b (when da' and db' are set to "0" and dc' is set to "1": case No. 4), a selection signal for selecting a receiving-system to be connected to the antenna 12a is output (sa is set to "1"). In this case, two receiving-systems to be connected to the antennas 12a and 12b are resultantly selected and power consumption increases compared to the case in which only one receiving-system is selected.

Therefore, in the case of the example in FIG. 2, delay times of input lines having lower priorities are increased for a plurality of inputs to logic gates and signals having higher priorities are input to the logic gates in advance. In the case of this embodiment, when a plurality of determination result signals are input, a receiver circuit having a higher priority is preferentially selected. Therefore, a selection result in this case is the same as the case in which the signal having the higher priority is independently input (for example, cases No. 1, No. 4, No. 5, and No. 7). That is, the signal selecting circuit 16 of this embodiment solves the above problems by using delay elements so that a signal having a higher priority is first input and, after that, a signal having a lower priority is input. It is possible to set the delay time of each delay element so that the delay time of an input line having a lower priority becomes larger than the delay time of an input light having a higher priority among input lines of logic gates while a logic circuit is mounted. It is possible to use a device (e.g. a delay device) other than an inverter as a delay element.

The DFFs (output-side DFFs) 28d, 28e, and 28f are provided at the rear stage of the logic circuit. Lines corresponding to receiving-systems (lines to be connected to output terminals of the inverters 32b, 32c, and 32k) are input to CK terminals of respectively corresponding DFFs 28d, 28e, and 28f. Because a power supply voltage VDD is applied to D terminals of the DFFs 28d, 28e, and 28f and the D terminals become H-level, a selection signal is output from the Q terminal of one of the DFFs 28d, 28e, and 28f to whose CK terminal an H-level signal is input. The DFFs 28d, 28e, and 28f function as latching circuits until they are reset.

Moreover, as shown in FIG. 1, a power supply of each section of the receiver 10 is controlled in accordance with a signal output from the signal selecting circuit 16. First, the switching devices 18a, 18b, and 18c are provided between the antennas 12a, 12b, and 12c, and a demodulating circuit 34. Only a switching device among the switching devices 18a, 18b, and 18c to which an H-level selection signal output from the signal selecting circuit 16 or a signal according to the selection signal is input is turned on. As a result, the antennas 12a, 12b, and 12c corresponding to the turned-on switching devices 18a, 18b, 18c are electrically connected with the demodulating circuit 34. Moreover, the switching devices 18a, 18b, and 18c other than the switching devices 18a, 18b, and 18c are turned off and electrical connection is cut off. As a result, circuits between the turned-off switching devices 18a, 18b, and 18c and the antennas 12a, 12b, and 12c corresponding to the switching devices 18a, 18b, and 18c are brought into a non-operation state. According to the above configuration, it is possible to reduce the power consumption of the circuits from the switching devices 18a, 18b, and 18c to the respective antennas 12a, 12b, and 12c.

Moreover, the receiving-level determining section 14a, 14b, and 14c respectively have a configuration in which power supply is stopped and brought into a non-operation state when a selection signal is output from any one of the output-side DFFs 28d, 28e, and 28f of the signal selecting circuit 16. An OR gate 36 for performing a logical OR of outputs of DFFs 28d, 28e, and 28f is provided. The switching devices 38a, 38b, and 38c provided in power supply lines (power supply voltage: VDD) of the receiving-level determining sections 14a, 14b, and 14c are turned off in accordance with an output signal (H level) of the OR gate 36. As a result, it is possible to stop the supply of power when receiving-level determination is unnecessary and reduce power consumption.

Furthermore, supply and stop of power of the demodulating circuit 34 are controlled by the switching device 38d provided in the power supply line (power supply voltage: VDD) of the circuit 34. Specifically, an output of the OR gate 36 serves as a control signal of the switching device 38d through an inverter 32n. When a selection signal is output from any one of the output-side DFFs 28d, 28e, and 28f of the signal selecting circuit 16, the power supply is started (resumed). As a result, it is possible to stop the supply of power when signal processing is unnecessary and reduce power consumption.

The signal selecting circuit 16 outputs a signal for restoring the power supply state of each section of the receiver 10 to a standby mode (that is, a state before the above signal selecting processing, all of the receiving-level determining sections 14a, 14b, and 14c are turned on, all of the switching devices 18a, 18b, and 18c are turned off, and the demodulating circuit 34 is turned off). Therefore, it is preferable to provide a resetting section (not illustrated) for outputting a reset signal (FIG. 2) to the signal selecting circuit 16 in accordance with a designation signal input from the demodulating circuit 34 or through an artificial operation (e.g. pressing of a predetermined bush button).

Figure 4:
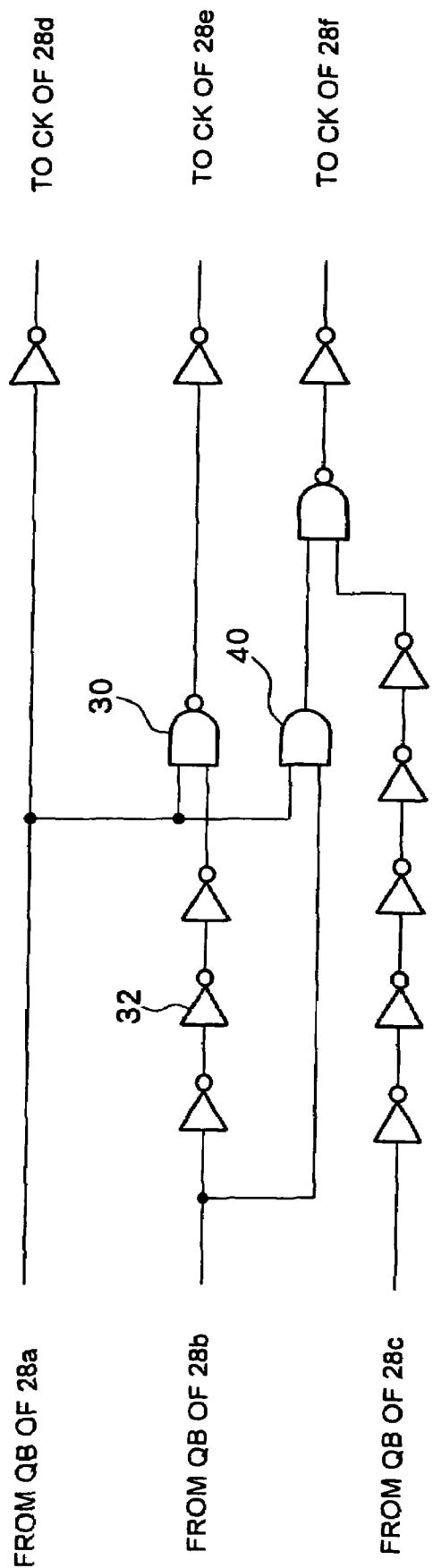
FIG. 4 is a circuit diagram showing a signal selecting circuit (only in the broken-line frame in FIG. 2) of a receiver of second embodiment.

Preferred embodiments of the present invention are described above. However, the present invention is not restricted to the above embodiments. The same advantages can be obtained by various equivalent circuits. For example, the logic circuit inside the broken line in FIG. 2 can be replaced with the logic circuit in FIG. 4 using a NAND gate 30, AND gate 40, and inverter 32. The same result as that in FIG. 3 can be also obtained by the circuit in FIG. 4. Also in the case of the circuit in FIG. 4, the cascaded inverters 32 are used as a delay elements.

Moreover, the signal selecting circuit 16 shown in FIG. 2 generates a selection signal in accordance with QB outputs (inverted outputs) of the input-side DFFs 28d, 28e, and 28f. However, it is also possible to generate a selection signal in accordance with Q outputs of the DFFs 28d, 28e, and 28f instead of the QB outputs.

As described above, the above embodiment can reduce the power consumption of a receiver. The receiver can be used as a radio communication device (radio receiver) for radio-communication of a control signal of an on-vehicle system such as an on-vehicle communication device for a signal for controlling locking/unlocking of a vehicle door lock, motive power mechanism (engine or motor), an on-vehicle communication device for a signal for controlling ON/OFF of electrical equipment or the like, or remote control unit (such as radio key unit or mobile telephone) for performing communication with these on-vehicle communication devices. Particularly, the receiver is preferable for a radio communication device for which downsizing is requested.

What is claimed is:

1. A receiver, comprising: a plurality of receiver circuits respectively connected to different antennas; and a selecting circuit for selecting any one of the receiver circuits having a receiving level equal to or higher than a predetermined threshold value, wherein power consumption is reduced by bringing at least some of non-selected receiver circuits into a non-operation state, and wherein the selecting circuit selects one of the plurality circuits in accordance with a preset priority that is independent of the receiving level of the receiving circuits, and wherein a demodulating circuit for demodulating an incoming signal is included, and when any one of the plurality of receiver circuits is selected by the selecting circuit, power supply to the demodulating circuit is started.

2. The receiver according to claim 1, wherein a switching device for switching connection/cutoff between each antenna and its rear-stage circuit is included in each of the receiver circuits, and switching devices included in the non-selected receiver circuits are switched from a connection state to a cutoff state, and circuits from the switching devices to antennas are brought into a non-operation state.

3. The receiver according to claim 1, wherein a determining section for outputting a binary determination result signal that is differentiated in accordance with a case in which the receiving level of each of the receiver circuits is equal to or higher than a predetermined threshold value and a case in which the receiving level is lower than the threshold value is included in each of the receiver circuits, a logic circuit for outputting a selection signal for selecting a receiver circuit in accordance with a determination result signal obtained from each determining section is included in the selecting circuit, when a determination result signal sent from only one determining section shows that it is equal to or higher than a predetermined threshold value, the logic circuit outputs a selection signal for selecting the receiver circuit in which the determining section is included, when determination result signals sent from a plurality of determining sections show that they are equal to or higher than a predetermined threshold value, the logic circuit outputs a selection signal for selecting a predetermined receiver circuit having a higher priority among the receiver circuit in which the determining section is included.

4. The receiver according to claim 3, wherein when any one of the plurality of receiver circuits is selected by the selecting circuit, power supply to the determining sections is stopped.

5. The receiver according to claim 3, wherein when a determination result signal is input from any one of the plurality of determining sections, the logic circuit temporarily stops the processing according to a determination result signal thereafter output from the determining section.

6. The receiver according to claim 3, wherein a delay element is included that delays a determination result signal of the receiver circuit having a lower priority or a signal obtained by the logic circuit in accordance with the determination result signal from a determination result signal of the receiver circuit having a higher priority or a signal obtained by the logic circuit in accordance with the determination result signal.

7. The receiver of claim 1, wherein the receiver is used for a remote control unit as part of an on-vehicle communication system including an on-vehicle unit and the remote control unit.

* * * * *